Patented June 3, 1952

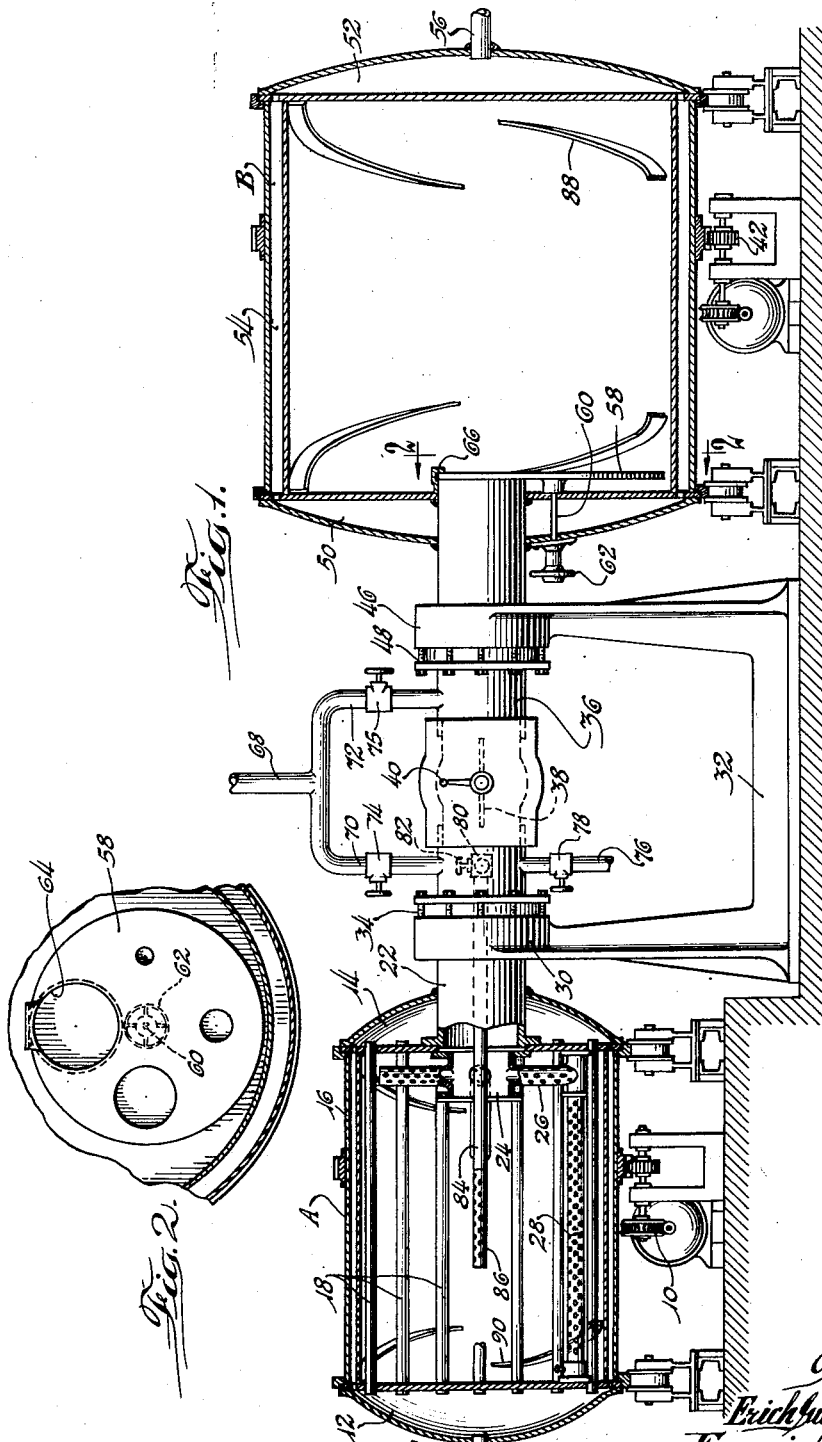

2,598,915

UNITED STATES PATENT OFFICE 2,598,915

APPARATUS FOR THE TREATMENT OF GRAINS

Erich Gustav Huzenlaub, Chicago, Ill., and Francis Heron Rogers, Elmhurst, Kenley, England, assignors, by mesne assignments, to Converted Rice, Inc., Houston, Tex., a corporation of Delaware Original application November 3, 1945, Serial No. 626,560. Divided and this application April 9, 1948, Serial No. 19,994. In Great Britain September 25, 1945

6 Claims. (Cl. 99—237)

This invention relates to apparatus for use in the treatment of grains and more particularly cereals for food and is a division of our copending application Serial No. 626,560, filed November 3, 1945, which has issued as Patent No. 2,539,999.

One of the objects of our invention is the provision of apparatus for steaming and drying of grain.

Another object of our invention is the provision of apparatus for the removal in whole or in part of the scent carriers from grain and for imparting an artificial flavor to grain.

Another object of our invention is the provision of apparatus for the steaming and drying of grain having means for controlling the rate of discharge of steam under pressure.

Another object of our invention is the provision of apparatus for the treatment of grain in which the grain may be independently subjected to steam pressure and vacuum.

Further objects and advantages will become apparent from the following description when read in conjunction with the drawings, in which:

Fig. 1 illustrates somewhat diagrammatically a preferred form of the apparatus constituting our invention; and Fig. 2 is a partial sectional view taken on the line 2—2 of Fig. 1.

Referring to Fig. 1, it will be seen that we have therein illustrated a steaming and drying vessel A adapted to be rotated through suitable gearing 10 and having one or more covered openings (not shown) through which grain may be introduced and removed. The vessel A is of a generally cylindrical shape and is provided with steam jackets 12 and 14 adjacent its ends, these steam jackets being connected by an annular steam jacket 16 and by steam pipes 18. Steam is supplied to the jackets 12, 14 and 16 and pipes 18 through a conduit 20 connected with any suitable source of steam.

The vessel A is provided with a section of exhaust or blow-off pipe 22 which rotates with the vessel. The blow-off pipe 22 is connected through a head 24 and branches 26 with axially extending foraminous tubes 28 which preferably have the construction shown in our United States patent application Serial No. 613,238, filed August 29, 1945, which has issued as Patent No. 2,547,393, but may have any other suitable construction. The section 22 of the blow-off pipe rotates in a bearing 30 carried by a pedestal 32 and a stuffing box 34 forms a sealed joint between the section 22 and a stationary section 36 of the blow-off pipe. This stationary section contains a butterfly valve 38 having an operating arm 40 connected with any suitable mechanism for quickly shifting the valve between closed and open positions.

In Fig. 1, we have shown the blow-off pipe as connecting the steam treating and drying vessel A with a second or flavoring vessel B which is mounted for rotation through gearing 42 and which is provided with a section 44 of blow-off pipe communicating with a stationary section 36 and rotating section 22 heretofore described. The section 44 has one end extending into a bearing 46 supported on the pedestal 32 and a stuffing box 48 forms a fluid-tight connection between this end and the adjacent end of the stationary portion 36 of the blow-off pipe.

The vessel B is provided with a closed opening or openings (not shown) through which grain may be introduced and removed. This vessel is also provided with steam jackets 50 and 52 at its ends and these jackets are connected by an annular steam jacket 54. A pipe 56 leads from any suitable source of steam supply and furnishes steam to the jackets 50, 52 and 54.

The end of the blow-off pipe which projects into the vessel B is provided with means to vary the effective size of this pipe so that any desired amount of flavors or aromas of the grain being treated in the steaming and drying vessel A can be removed. This means comprises a disk 58 mounted on a shaft 60 extending through one end of the vessel A and provided with a wheel 62 or other handle means whereby the disk 58 may be rotated to any desired position. As more clearly shown in Fig. 2, the disk 58 is provided with a plurality of openings 64, any one of which may be brought into alignment with the blow-off pipe. The openings 64 are of different sizes, the largest being equal in diameter to the inside diameter of the blow-off pipe. In the particular embodiment selected for illustration the disk 58 has only four openings 64 but this disk can be made of different sizes and provided with different numbers and sizes of openings as desired. A guide and support 66 is preferably welded or otherwise attached to the end of the blow-off pipe and has a depending portion overlying the disk 58 to help support the disk against the steam blast which is created when the butterfly valve 38 is suddenly shifted to open position.

The vessels A and B are preferably arranged for independent rotation and are of different sizes. In the illustration selected, the vessel B has twice the volumetric capacity of the vessel A. For use with certain types of grain, the different relative capacities of two vessels should be so selected that the volumetric capacity of the vessel B bears approximately the same ratio to the volumetric capacity of the vessel A as the volume of one pound of steam at atmospheric pressure bears to the volume of one pound of steam at the maximum steam pressure used in the vessel A.

Means are provided for independently connecting each of the vessels A and B with a source of vacuum. In Fig. 1, this means takes the form of a pipe 68 connected to a condenser or other source of vacuum and having branches 70 and 72 connected with the stationary portion 36 of the blow-off pipe on opposite sides of the butterfly valve 38. The branches are preferably provided with valves 74 and 75 of any usual construction. Steam may be supplied to the grain in the vessel A by way of a steam pipe 76 and that portion of the blow-off pipe which connects the steam pipe 76 with the interior of the vessel A. The steam pipe 76 is illustrated as being provided with the usual valve 78. Where it is desired to flavor a batch of grain in the vessel A, the flavoring material may be introduced through a pipe 80 and valve 82 connected to a pipe 84 extending axially of the vessel A and having a perforated section 86.

In utilizing the apparatus of Figs. 1 and 2, a batch of grain to be treated is introduced into vessel A and the cover reapplied to the opening through which the grain was introduced. For purposes of illustration we will assume that the batch of grain to be treated is composed of wheat. A second batch of a different kind of grain, such, for example, as rice, is introduced into flavoring vessel B and then this vessel is sealed by replacing the cover on the opening through which the grain was introduced. The quantities of grain in the two batches would ordinarily be equal. If desired, however, the quantity of rice may be more or less than the quantity of wheat and under these conditions the amount of flavor absorbed by the rice will be inversely proportional to the quantity thereof. That is, a larger batch of rice will receive a weaker flavor whereas a small batch of rice will receive a stronger flavor, other conditions being equal.

The wheat to be steamed and dried is preferably first subjected to a vacuum to remove as much air as possible from the grain itself and thereby facilitate the penetration of moisture into the grain. With the butterfly valve 38 in closed position, valve 74 is opened to connect the interior of vessel A with the condenser or other source of vacuum. The grain introduced into vessel A is preferably at atmospheric temperature so that when steam is introduced into the vessel A, the steam will condense on the grain and produce moisture which penetrates the individual grains. It is therefore not desirable to heat up the grain prior to the first steaming operation, but it is desirable to introduce a small amount of steam into the steam jackets 12, 14, and 16 and pipes 18 to heat these parts to such a temperature that little condensation will occur thereon and most of the condensate will be formed directly on the grain. During the withdrawal of air from the vessel A, this vessel is preferably rotated through gearing 10 to produce an agitation of the grain and so expose all parts thereof to the subatmospheric pressure.

As soon as a sufficiently high vacuum has been produced in the vessel A, the vacuum valve 74 is closed and saturated steam introduced by opening steam valve 78. The inrushing steam strikes the cold grain and condenses thereon and the condensate thus formed tends to penetrate the grain. Assuming for the purpose of this illustration that the vessel A has a capacity of 800 cubic feet and has placed therein 8 tons of wheat, the steam pressure is then permitted to build up to approximately 10 pounds gauge and is maintained for 2½ minutes. During this period the grain is agitated by the rotary motion of the vessel A, the individual grains are heated, and the moisture from the steam penetrates an appreciable distance into the endosperm.

While the wheat in vessel A is being steamed, vessel B is evacuated through valve 75 to produce therein a vacuum in the order of 27 inches of mercury. During this period vessel B is preferably rotated through gearing 42 to agitate the grain therein. In order to increase the agitation of the grain, the vessel B is provided with helical inwardly projecting baffles 88 and the vessel A is preferably provided with similar baffles 90. The rice in vessel B is at approximately atmospheric temperature and it is undesirable to heat this rice prior to introduction to the blow-off vessel A. However, during this preparatory period, a small amount of steam may be introduced into the steam jackets of vessel B to warm up the walls of this vessel and reduce condensation thereon when the blow-off is introduced. After vessel B has been evacuated, the valve 75 is closed. If the disk 58 is not in the desired position, rotation of vessel B is momentarily stopped and the disk 58 is moved to bring the proper opening into registration with the blow-off pipe.

After the wheat in vessel A has been steamed for 2½ minutes, the butterfly valve 38 is suddenly opened to connect the interior of vessel A which is then at 10 pounds gauge pressure with the interior of vessel B which is preferably under a vacuum of about 27 inches of mercury. The blow-off pipe which connects the two vessels is made of such size as to give the maximum rate of blow-off desirable under any conditions and the actual rate of blow-off for any particular treatment is determined by the position of the disk 58. If it is desired to transfer maximum taste and aroma from the wheat to the rice, the maximum size opening 64 is brought into alignment with the blow-off pipe, but if a lesser transfer of aroma and flavor is desired, a smaller opening 64 is placed in alignment with the blow-off pipe.

The sudden opening of the blow-off valve 38 produces a rush of steam from the vessel A to the vessel B and the resulting rush of steam around the grains of wheat in vessel A distills off those ingredients of the wheat which produce flavor and aroma therein, the degree of distillation being determined by the position of the disk 58. The vapors discharged from vessel A rush into vessel B and condense on the relatively cold rice therein and impart a wheat flavor to this rice. The extent to which this wheat flavor is imparted to the rice depends upon the degree of distillation of the wheat and also upon the quantity of rice in the vessel B. During this blow-off, both vessels are preferably rotated and in fact such rotation is preferably continued throughout the treatment. When the pressure in the two vessels has equalized, the blow-off valve 38 is closed.

Steam valve 78 is then again opened to introduce steam into vessel A and a steam pressure of approximately 10 pounds gauge pressure is maintained for 2½ minutes. During this second steaming the moisture penetrates further into the endosperm of the wheat. In the meantime, vessel B is again evacuated in preparation for the next blow-off. At the termination of 2½ minutes steaming period, blow-off valve 38 is again suddenly opened and left open until the pressure in the two vessels is equalized. This blow-off valve is then closed and the cycle of operation is repeated until the wheat in vessel A has been subjected to the desired number of steaming operations. At the conclusion of the steaming operations, the endosperms of the wheat grains have been completely penetrated by the moisture.

At the end of the last steaming operation and completion of the blow-off following such operation, the interior of vessel A is preferably connected to the condenser and subjected to a vacuum of approximately 27 inches of mercury for about 10 minutes. During this period agitation of the grain is maintained and the steam jackets are maintained only slightly warm. If it is desired to flavor the wheat while still in the treating vessel A, the flavoring material can be introduced by opening valve 82 while vessel A is rotating and is cut off from the source of vacuum.

After the grain has been sprayed with the flavoring material and has been left exposed to this material for a desired length of time, the grain in vessel A is dried by connecting this vessel to the source of vacuum and by supplying the maximum amount of steam to the steam jackets 12, 14 and 16 and steam pipes 18. When the grain attains normal moisture content, it is removed from vessel A and stored in a tempering bin or otherwise handled in any suitable manner.

Having now particularly described and ascertained the nature of our said invention, and in what manner the same is to be performed, we declare that what we claim is:

1. Apparatus of the class described comprising a vessel having a chamber for receiving a batch of grain to be treated, said chamber being provided with a steam jacket and means connecting said steam jacket with a source of steam, conduit means communicating with the interior of said chamber for subjecting said grain to wet steam under pressure, a blow-off pipe through which the steam can be suddenly released, a quick opening valve for controlling release of steam through said blow-off pipe, and means independent of said valve for variably controlling the effective cross section of said pipe whereby different rates of steam release for said vessel may be provided.

2. Apparatus of the class described comprising a vessel having a chamber for receiving a batch of grain to be treated, means for rotating said vessel, said chamber having a steam jacket and means connecting said steam jacket with a source of steam, conduit means communicating with the interior of said chamber for subjecting grain in said chamber to wet steam under pressure, a relatively large pipe for connecting said chamber with a source of vacuum and through which steam under pressure can be suddenly released from said chamber, a quick opening valve controlling said pipe, and a plate having different sized orifices adapted to be brought into alignment with said pipe to vary the effective size thereof and thereby vary the rate of steam discharge therethrough.

3. Apparatus for treating cereal grains which comprises a first vessel having a chamber adapted to receive a batch of one kind of grain for treatment therein, a second vessel having a chamber adapted to receive a second batch of grain of a different kind, each of said chambers having a steam jacket and means connecting each of said jackets with a source of steam, conduit means communicating with the interior of the first vessel chamber for introducing wet steam under pressure into said first chamber, a blow-off pipe connecting said chambers, a valve controlling said pipe, and means for rotating said vessels.

4. Apparatus for treating cereal grains which comprises a first vessel having a chamber adapted to receive a batch of one kind of grain for treatment therein, a second vessel having a chamber adapted to receive a second batch of grain of a different kind, each of said chambers having a steam jacket and means connecting each of said jackets with a source of steam, conduit means communicating with the interior of the first vessel chamber for introducing wet steam under pressure into said first chamber, a blow-off pipe connecting said chambers, a valve controlling said pipe, means for rotating said vessels, and means for creating a vacuum in said second-vessel chamber prior to opening said valve.

5. Apparatus for treating cereal grains which comprises a first vessel having a chamber adapted to receive a batch of one kind of grain for treatment therein, a second vessel having a chamber adapted to receive a second batch of grain of a different kind, each of said chambers having a steam jacket and means connecting each of said jackets with a source of steam, conduit means communicating with the interior of the first vessel chamber for introducing wet steam under pressure into said first chamber, a blow-off pipe connecting said chambers, a valve controlling said pipe, means for rotating said vessels, and means in said second vessel for variably controlling the size of said blow-off pipe.

6. Apparatus for treating cereal grains which comprises a first vessel having a chamber adapted to receive a batch of one kind of grain for treatment therein, a second vessel having a chamber adapted to receive a second batch of grain of a different kind, each of said chambers having a steam jacket and means connecting each of said jackets with a source of steam, conduit means communicating with the interior of the first vessel chamber for introducing wet steam under pressure into said first chamber, a blow-off pipe connecting said chambers, a valve controlling said pipe, means for rotating said vessels, and means for connecting either or both of said chambers to a source of vacuum.

ERICH GUSTAV HUZENLAUB.
FRANCIS HERON ROGERS.

REFERENCES CITED

The following references are of record in the file of this patent:

UNITED STATES PATENTS

| Number | Name | Date |
|---|---|---|
| 433,399 | Elsworth et al. | July 29, 1890 |
| 640,161 | Hesse | Dec. 26, 1899 |
| 928,795 | Prims | July 20, 1909 |
| 1,035,842 | Anderson | Aug. 20, 1912 |
| 1,867,541 | Shellabarger | July 12, 1932 |
| 2,239,608 | Huzenlaub | Apr. 22, 1941 |